March 6, 1934.  L. S. FRAPPIER ET AL  1,949,464
SHUTTER MECHANISM FOR MOTION PICTURE PROJECTION MACHINES
Original Filed Aug. 31, 1928  3 Sheets-Sheet 3
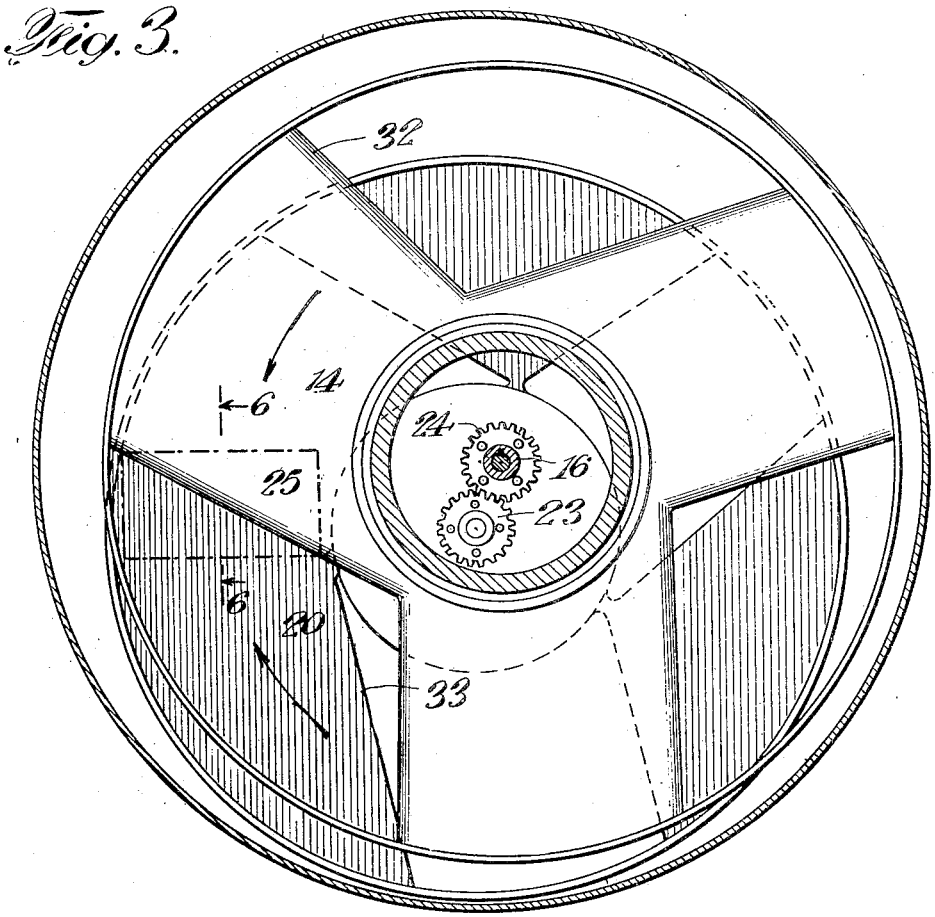
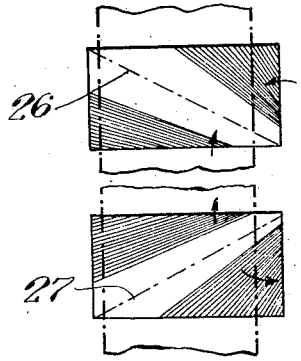
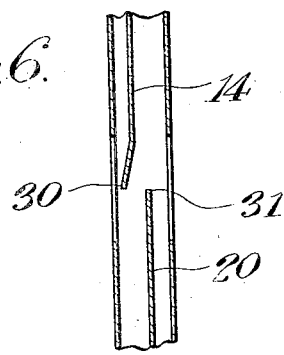

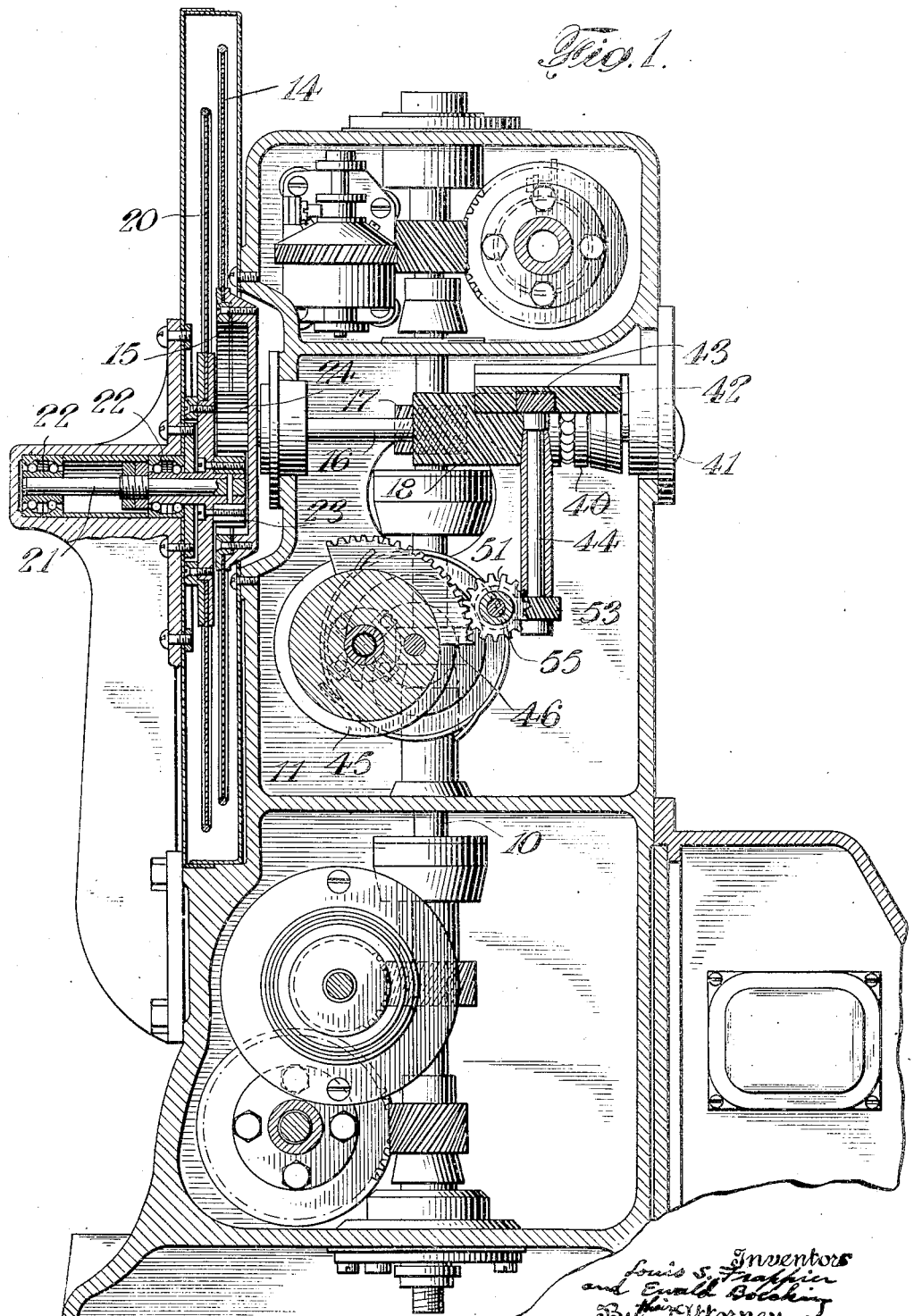

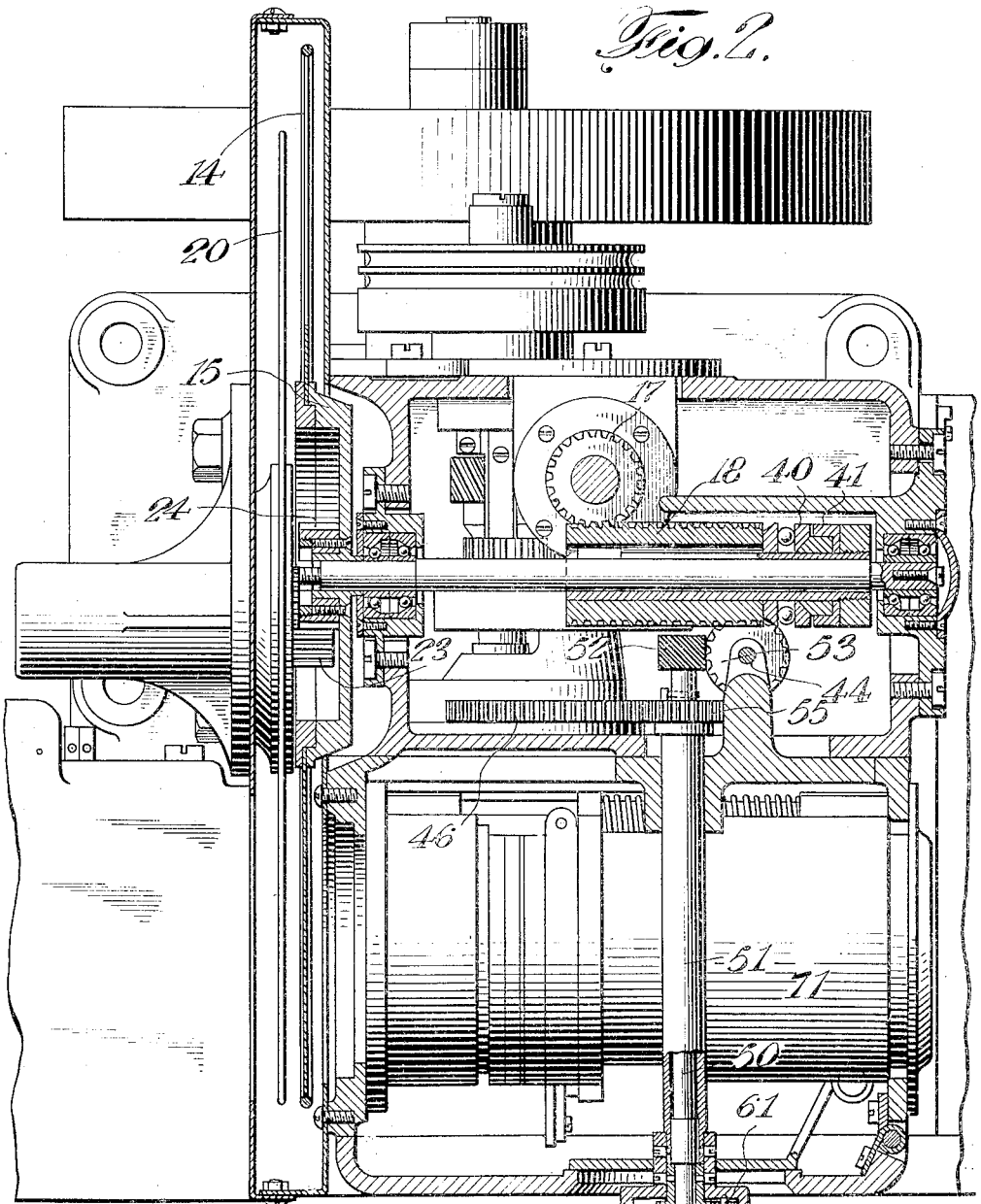

Patented Mar. 6, 1934

1,949,464

UNITED STATES PATENT OFFICE 1,949,464

SHUTTER MECHANISM FOR MOTION PICTURE PROJECTION MACHINES

Louis Simon Frappier and Ewald Boecking, Brooklyn, N. Y., assignors to International Projector Corporation, New York, N. Y., a corporation of Delaware Original application August 31, 1928, Serial No. 303,162. Divided and this application October 3, 1928, Serial No. 310,023

6 Claims. (Cl. 88—17)

This invention relates to motion picture projection apparatus, and more particularly to a new and improved shutter mechanism for periodically interrupting the projection light. The invention also provides a framing mechanism for adjusting the relative positions of the shutters and the motion picture film.

This application is a division of our copending application, Serial No. 303,162, filed August 31, 1928, for Improvements in projection machine.

The invention provides a shutter which closes along one diagonal of the projected picture and opens along the opposite diagonal thereof whereby the light is evenly applied over the various parts of the picture and so-called dark edges are largely eliminated. The framing mechanism includes means for simultaneously varying the angular relationship of the intermittent sprocket and shutters with respect to the driving apparatus, and means for differentially varying the relative angular relationship of the above parts for securing a minute adjustment.

An object of the invention is to provide a shutter mechanism capable of intermittently admitting a uniform light over substantially the entire area of the picture.

A further object is to equalize the amount of light falling on the various parts of the picture.

Another object is to reduce the fire hazard of the projection machine.

A still further object is to provide accurate means for controlling the adjustment of the shutters and of the intermittent sprocket.

The above objects and others which will be apparent as the nature of the invention is disclosed, are accomplished by locating the shutter mechanism between the light source and the film whereby the light is cut off from the picture when the shutter is closed. The total amount of heat applied to the film is consequently materially reduced. The two shutters are mounted for rotation in opposite directions and open and close along opposite diagonals of the picture. The time of opening or closing is therefore reduced to that required for each shutter to travel over one half of the picture. The framing mechanism includes a planetary gear which may be interlocked for simultaneously operating the housing of the Geneva gear and the shutter timing. It may also be operated differentially for causing a fine adjustment of the shutter timing.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a vertical section through the projection head of a motion picture projection machine showing the mounting of the shutters and driving mechanism therefor;

Fig. 2 is a horizontal section through the projection head showing the shutter drive and framing mechanism;

Fig. 3 is a detailed view of the shutters;

Fig. 4 is a diagram of the picture aperture with the shutters closing;

Fig. 5 is a diagram of the picture aperture with the shutters opening; and

Fig. 6 is a section taken on the line 6—6 of Fig. 3 showing the relationship of the two shutters.

Like reference characters denote like parts in the several figures of the drawings.

In the following description and in the claims parts will be identified by specific names for convenience, but they are intended to be as generic in their application to similar parts as the art will permit.

Referring to the drawings more in detail, a vertical drive shaft 10 is shown extending through the entire projection head and serving as a driving means for the various sprockets (not shown), for the Geneva gear 11 and for the shutter mechanism.

The shutter mechanism comprises a shutter 14 which is mounted upon a cup shaped member 15 secured to shaft 16 which is driven from vertical drive shaft 10 by cooperating gears 17 and 18. Shutter 20 is mounted upon shaft 21 supported in bearings 22 which are positioned in the framework of the machine. Shutter 20 is rotated by spur gear 23 cooperating with a similar spur gear 24 which is mounted upon shaft 16 and carried interiorly of cup shaped member 15. Spur gears 23 and 24 are of identical size so that the shutters 14 and 20 are simultaneously rotated in opposite directions and at identical speeds.

Shutters 14 and 20 (Fig. 3) are provided with a plurality of apertures which are so related that closing of picture aperture 25 takes place along diagonal 26 (Fig. 4) and that opening takes place along the other diagonal 27 (Fig. 5). One edge of shutter 14 may be bent as shown in Fig. 6 to provide a fan for cooling purposes.

The operation of the shutters is as follows: Shutter 14 is shown in Fig. 3 as revolving in a counterclockwise direction and shutter 20 as revolving in a clockwise direction. Leading edge 30 on shutter 14 and leading edge 31 on shutter 20 have met in the position shown in Figs. 3 and 6 completely cutting off the light from picture aperture 25. In cutting off the light as above, the shutters advance from opposite corners of the picture aperture as illustrated in Fig. 4 and meet along diagonal 26. Upon further rotation of the shutters, trailing edge 32 of shutter 14 and trailing edge 33 of shutter 20 will separate from diagonal 27 toward the opposite corners of the picture aperture as shown in Fig. 5.

Gears 17 and 18 are so related that the normal operating movement of the machine causes gear 18 to bear against thrust bearing 40. Said thrust bearing rests against ear 41 formed as a part of sliding yoke 42 which may be longitudinally adjusted by pinion 43 secured to shaft 44. Gear 18 is keyed to shaft 16 but is free to slide longitudinally thereof in accordance with the position of thrust bearing 40 and rack 42.

Geneva gear 11 which may be of any well known construction, includes a housing 45 provided with a rack 46 by means of which rotational adjustment is obtained.

The framing mechanism includes shaft 50 which is loosely journalled in sleeve 51 and provided with a gear 52 meshing with a corresponding gear 53 on shaft 44. Sleeve 51 is provided with a gear 55 meshing with rack 46 on housing 45 of the Geneva gear.

The planetary control for shafts 50 and 51 comprises gears 56 and 57 which are firmly secured to sleeve 51 and shaft 50 respectively. Said gears differ slightly in size, as by one tooth. Housing 58 is also secured to sleeve 51 and may be provided with a knurled surface to enable the same to be manually adjusted. Disk 59 is loosely journalled on shaft 50 and is carried within housing 58, but is free to rotate independently thereof. Spur gear 60 is carried by disk 59 in a position to mesh with gears 56 and 57. Shaft 61 of gear 60 is adapted to seat in a recess in housing 58 when disk 59 is in its innermost position. Said disk may, however, be moved outwardly against the pressure of spring 62 which operates between a screw 63 secured in the end of shaft 50 and a recess in a tubular extension 64 of disk 59 which serves as a hand grip for adjusting purposes.

The operation of the framing mechanism is as follows: In the position shown in Fig. 2, pin 61 is seated in housing 68 and the various parts are locked for simultaneous operation. Turning movement of housing 58 will therefore turn both shaft 50 and sleeve 51 thereby simultaneously adjusting rack 46 and rack 42. Rack 46 controls the relationship of Geneva gear 11 to the drive shaft 10 and varies the timing of the film. Rack 42 varies the longitudinal position of gear 18 on shaft 16 and accordingly varies the angular position of shutters 14 and 20 with respect to shaft 10. By turning housing 58 therefore both the timing of the shutters and the position of the Geneva gear may be simultaneously altered.

For a minute adjustment of the shutter timing, knob 64 is moved outwardly against the tension of spring 62 releasing pin 61 from housing 58. Gear 56 tends to remain stationary due to the friction of the Geneva gear housing. Gear 60 may be rotated thereabout by turning hand grip 64. Gear 57 is then subjected to a slow turning movement depending upon the difference in teeth between gears 56 and 57, thereby causing a slow movement of shaft 50 which is transferred in the manner above described to rack 42 and gear 18 through which shutters 14 and 20 are driven.

Shutters 14 and 20 (Fig. 2) are positioned between the source of light (not shown) and aperture plate over which the film is passed. The light controlled by said shutters passes through said aperture plate and is focused by lens tube 71 on the distant screen.

The shutter mechanism above described, by means of which the cut-off of the light rays and the opening occur on different diagonals of the picture, results in maintaining the entire center portion of the picture of substantially uniform light intensity. Furthermore by positioning the shutters between the film and the source of light heat is prevented from being applied to the film when the shutters are in closed position. Heat is thus applied over only a small portion of the total time with a consequent reduction in fire hazard.

Although a specific embodiment of the invention has been shown and described for purposes of illustration, it is to be understood that various omissions, substitutions and changes in the forms and details of the device illustrated and in its operation, may be made by those skilled in the art without departing from the scope of the invention, which is not to be limited by the present specific description, but only in accordance with the following claims.

What is claimed is:

1. In combination with shutter mechanism and an intermittent driving mechanism, means for driving said shutter comprising a pair of cooperating gears, framing mechanism comprising a rack and pinion for longitudinally varying one of said gears with respect to the other, a second rack and pinion for rotatably varying intermittent driving mechanism, and a single control means for operating both of said pinions.

2. In combination with shutter mechanism and an intermittent driving mechanism, means for driving said shutter comprising a pair of cooperating gears, framing mechanism comprising a rack and pinion for longitudinally varying one of said gears with respect to the other, a second rack and pinion for rotatably varying said intermittent driving mechanism, and a single control means for differentially operating both of said pinions.

3. In a projection machine including shutter mechanism and an intermittent sprocket, sprocket framing means for said shutter and said sprocket, a planetary gear interconnecting said separate framing means, means for interlocking the parts of said gear whereby the timing of said shutter and said intermittent sprocket are simultaneously varied, and means for holding the sprocket adjustment and operating said planetary gear for causing a minute adjustment of the timing of said shutter only.

4. In a projection head, a rotating shaft, a cupped member secured thereto, a shutter carried by said cupped member, a second shutter mounted eccentrically of said first shutter, and cooperating gears included within said cupped member for driving said second shutter, one of said gears being operatively integral with said first mentioned shaft.

5. In a projection machine including a shutter mechanism and an intermittent sprocket, a framing mechanism, concentric shafts adapted to control said framing mechanism and shutter mechanism, means for operating said shafts simultaneously and means for differentially operating one of said shafts with respect to the other of said shafts whereby the timing of said shutters and the framing mechanism may be adjusted either simultaneously or selectively.

6. In a projection machine including a shutter mechanism and an intermittent sprocket, control means therefor comprising concentric shafts associated with said shutter mechanism and with said intermittent sprocket, gears carried by said shafts, an idler gear in mesh with both of said gears and forming in combination therewith a planetary drive, means for locking said idler gear for simultaneously adjusting said shafts and means for rotating said idler gear about said other gears whereby planetary movement is obtained and a minute adjustment of one of said shafts with respect to the other of said shafts is obtained.

LOUIS SIMON FRAPPIER.
EWALD BOECKING.